Figure 1:
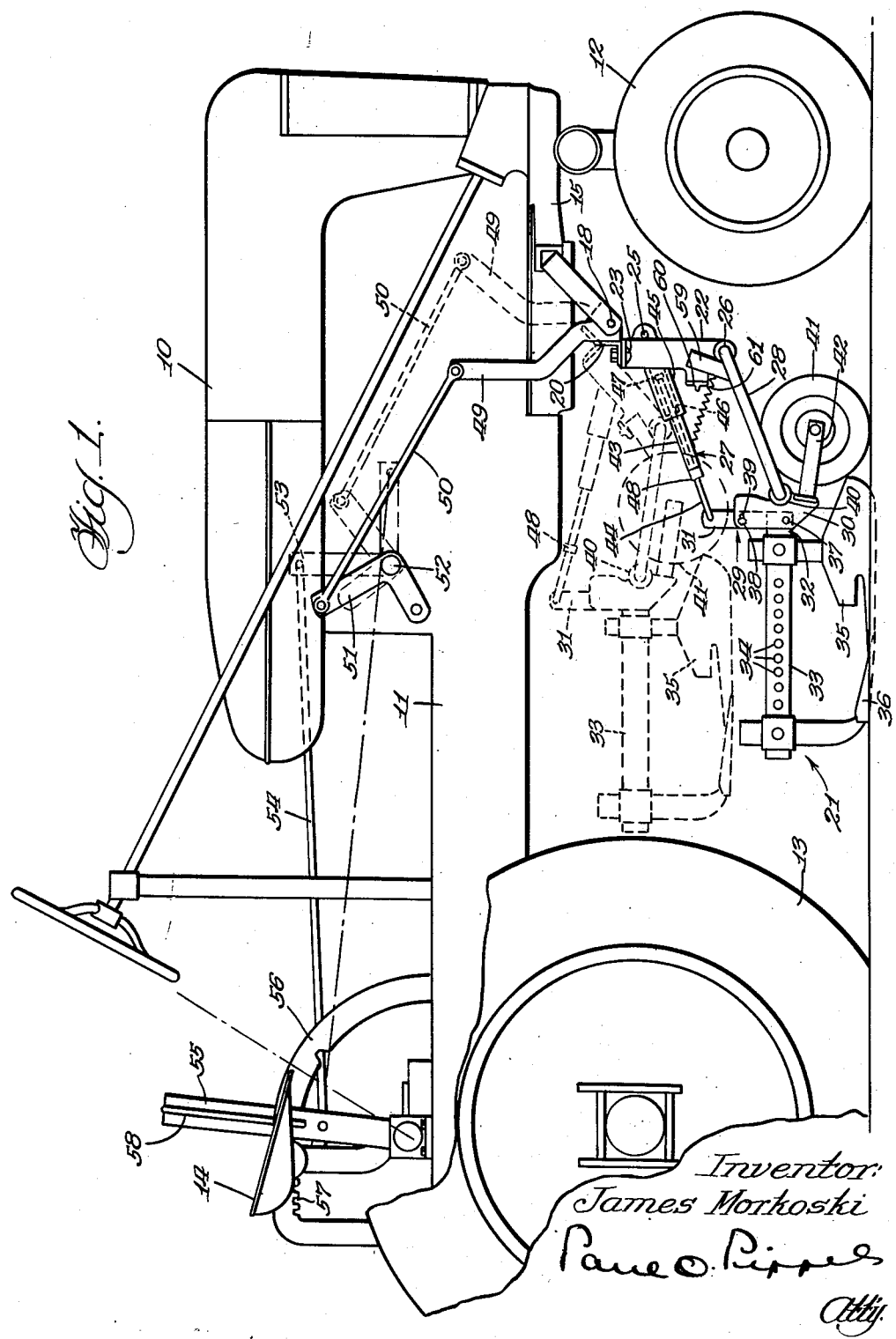

April 6, 1954   J. MORKOSKI   2,674,170
AGRICULTURAL IMPLEMENT
Filed Dec. 6, 1949   2 Sheets-Sheet 1

Inventor:
James Morkoski
Atty.

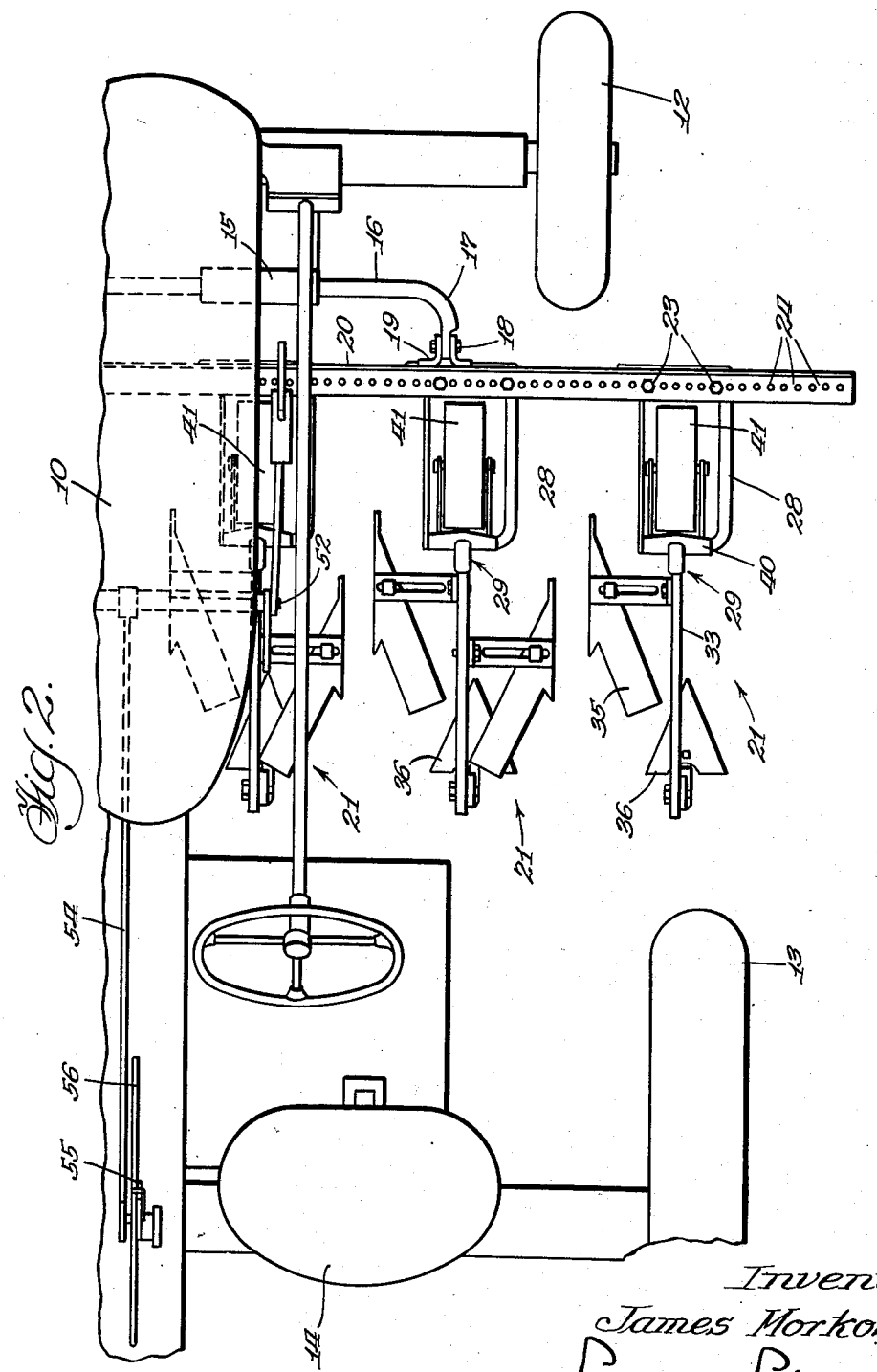

Patented Apr. 6, 1954

2,674,170

UNITED STATES PATENT OFFICE 2,674,170

AGRICULTURAL IMPLEMENT

James Morkoski, Liverpool, Ill., assignor to International Harvester Company, a corporation of New Jersey Application December 6, 1949, Serial No. 131,350

8 Claims. (Cl. 97—47.29)

This invention relates to agricultural implements and particularly to a tractor-mounted cultivator or the like. More specifically the invention concerns lifting mechanism for moving the implement between operating and transport positions.

The invention is described in its application to a tractor-mounted earth-working implement, such as a cultivator, of the type carried between the front and rear wheels of the tractor and supported from the body thereof. In cultivators of this type one of the problems encountered has been the lifting of the earth working tools high enough for clearance purposes in transporting the implement while avoiding striking the implement against the under parts of the tractor. A common method employed in lifting has involved the use of parallel links by which the earth-working tools are pivotally supported from the tractor. A lifting connection is then made to the links and the links swung upwardly about their pivots to raise the tool out of the ground. With such arrangements it has been difficult to secure adequate ground clearance for the tools, and the swinging of the parallel links has been hindered by parts of the tractor. The principal advantage in the use of the parallel links has been the ability of the earth-working tools to rise and fall in a generally straight line vertically in operating position and to be raised to a transport position where the tools maintain substantially the same parallel position with the ground that they occupied in operating position. The use of a rock-shaft has generally been regarded as the best manner in which to secure maximum transport height for the tools. In such a method the tools are connected directly to a rock-shaft on the tractor, and upon rocking the shaft the tools are raised in an angular path about the axis of the rock-shaft. With this mechanism the tools are lifted high but it is impossible to have any of the earth-working tools near the tractor body as they will strike it in rising.

The principal object of the present invention is to provide in an implement mounted under the body of a tractor means for securing maximum clearance for the implement above the ground.

Another object of the invention is to provide in mounting mechanism for an agricultural implement to be supported from a traveling vehicle means for securing maximum clearance of the implement in transport position while retaining substantially the position the implement occupied when in earth-working position.

Another object of the invention is to provide in a tractor-mounted agricultural implement means for mounting an implement upon a tractor or the like which provides parallel link operation for the implement in earth-working position and which includes the lifting advantages of a rock-shaft in raising the implement to transport position.

Other objects of the invention will become clear from the following detailed description when read in conjunction with the accompanying drawings, wherein:

Figure 1 is a view in side elevation of a tractor having mounted thereupon an implement embodying the features of the present invention; and Figure 2 is a plan view of the structure shown in Figure 1, with parts removed for clarity.

Referring to the drawings, the numeral 10 designates the body of a tractor having a power plant 11, laterally spaced front wheels 12, and rear drive wheels 13, only one of which is shown. As will be clear from a study of Figure 2, the tractor upon which the cultivator of the invention is mounted is of the offset body type affording the tractor operator from his station 14 a clear view of the area to be worked by the ground-working tools.

Provided at the forward end of the tractor is a casting 15 having a square opening therein adapted to adjustably receive a square bar 16 curved downwardly and forwardly at each end thereof, only one end being shown in the drawings, to provide an arm 17. The end of arm 17 is pivotally connected by a transversely extending bolt 18 to a pair of lugs 19 affixed to an angle bar 20 extending transversely under the tractor parallel to the bar 16. Angle bar 20, it should be understood, is divided into two parts extending to opposite sides of the tractor and serves for the connection thereto of one or more earth-working units generally designated by the numeral 21. The earth-working units 21 are each substantial duplicates and a description of one will suffice for all.

Each unit 21 comprises a vertically extending bracket 22 secured by a pair of bolts 23 to the angle bar 20. It should be noted in Figure 2 that the angle bar 20 is provided with a plurality of apertures 24 for the reception of the bolts 23 so that the units 21 may be adjusted to any desired spacing upon the angle bar support. It will likewise be noted that by virtue of its pivotal connection to the bar 16 the angle bar 20 may be rocked about the pivots 18 as an axis.

The bracket 22 serves for the pivotal mounting at 25 and 26 of a pair of vertically spaced generally parallel links 27 and 28 respectively. These links are pivoted upon the bracket 22 for swinging movement in a vertical plane about their respective pivots on the bracket, and as noted in Figure 1 extend downwardly and rearwardly from the bracket. The rear ends of the links 27 and 28 are pivotally connected at vertically spaced locations to a bracket 29 which comprises separate portions 30 and 31. Portion 31 of the bracket 29 is L-shaped and one arm 32 thereof is affixed to a longitudinally extending drag bar 33 which is provided with openings 34 for the attachment to the drag link of earth-working tools 35 and 36. Portion 30 of the bracket 29 is secured to the portion 31 and to the drag link 33 by a pivot bolt 37. Portion 31 of the bracket is also connected to the portion 30 by a bolt 38 receivable in a slot 39 in the portion 30 to permit relative adjustment of the bracket portions for the purpose of adjusting the angle of the tool supporting drag link 33. Bracket 29 is provided with a bearing portion 40 which pivotally receives the rear end of the lower link 28. A gauge wheel 41 is mounted at the end of an arm 42 affixed to the bracket 29 and extends forwardly of the tools 35 and 36 to gauge the depth of operation thereof.

The upper parallel link 27 comprises a sleeve 43 and a shaft 44, the latter being pivotally connected to the upper end of the bracket 29. Shaft 44 is slidably receivable in the sleeve 43 which has an enlarged portion 45 forming an interior shoulder 46 engageable by a collar 47 at the end of the shaft 44 to prevent displacement thereof from the sleeve. At this point it should be clear that the earth-working tools 35 and 36 mounted upon the drag link 33 are capable of rising and falling in operating position by virtue of the vertical movement of links 27 and 28 about their pivots upon the bracket 22. The links 27 and 28 thus function in operating position of the tool as substantially parallel links to maintain the pitch of the tools and the generally parallel position thereof and of the link 33 with the ground in operating position. As pointed out before, displacement of the shaft 44 from sleeve 43 is prevented by engagement of collar 47 with shoulder 46. Relative movement of the sleeve 43 and shaft 44 in the other direction is limited by a collar 48 adjustably mounted upon the rod 44 and engageable with the end of the sleeve 43 when the tools are in their operating position, so that the links 27 and 28 function as parallel links.

Lifting of the earth-working units 21 to transport position is accomplished simultaneously by mechanism including an arm 49 affixed to the angle bar 20 at one side of the tractor and connected by a link 50 with a rock-arm 51 mounted upon a rock-shaft 52 carried upon the tractor body and extending transversely thereof. The other end of rock-shaft 52 has mounted thereupon an arm 53 which is connected by a rod 54 with an adjusting lever 55 mounted upon the tractor for pivotal movement over a quadrant 56 provided with notches 57 to receive a detent 58 carried by the lever 55. In the dotted line position of Figure 1 the arm 49 has moved forwardly and angle bar 20 has rocked about the pivot 16. The bracket 22 rotates with angle bar 20 until a lug 59 secured to link 28 engages a stop 60 carried by bracket 22, whereupon lifting of the tools is begun at the pivot of link 28 in bearing 40 when the lost motion between the lug and the stop is taken up. Rod 44 slides relative to sleeve 43 and collar 48 moves away from the end of the sleeve.

When the dotted line position of Figure 1 is reached the collar 47 abuts shoulder 46, and it will be noted that the drag link 33 and the tools 35 and 36 have maintained substantially the same parallel relationship with the ground as they did in the operating position.

Upon return of the arm 49 to the solid line position shown in Figure 1 and the lowering of the tools to the ground, the rod 44 telescopes in the sleeve 43 until the sleeve engages the stop collar 48. A spring 61 is provided connecting the sleeve 43 with the lower portion of the bracket 22 to urge the parallel links to swing downwardly and tend to maintain the earth-working tools in their operating position.

As shown in Figure 1, adequate clearance is provided in the transport position of the earth-working tools as is indicated by the dotted line position thereof. It will also be observed that if the upper link 27 were a rigid parallel link the drag link 33 and the tools carried thereby would move upwardly in an arc around the pivot of the angle bar 20 on the tractor. However, by virtue of the elongation of the upper link 27, when the implement is raised to transport position, the drag link 33 and the earth-working tools retain their parallelism with the ground and maximum elevation thereof is assured.

The operation of the implement of the present invention should be clearly understood from the foregoing description. It should likewise be understood that modifications may be made in the invention without departing from the spirit thereof or the scope of the appended claims.

What is claimed is:

1. In an agricultural implement, a support, an implement-carrying member pivotally mounted on the support for rocking movement relative thereto to vertically move the implement through an angular path between operating and transport positions, means in the connection of the implement to the member for maintaining the implement in substantially the same angular relationship with the ground that it occupied in the operating position thereof comprising a pair of vertically spaced substantially parallel links pivotally connected at one end to the member and at their other ends to the implement, one of said links comprising relatively slidable parts adapted for relative movement during vertical movement of the implement to compensate for the angular movement thereof, stop means for limiting the relative movement of said parts, and a connection between said member and the other of said links operable to limit pivoting of the latter relative to the member.

2. In an agricultural implement, a support, an implement-carrying member pivotally mounted on the support for rocking movement relative thereto to vertically move the implement through an angular path between operating and transport positions, means in the connection of the implement to the member for maintaining the implement in substantially the same angular relationship with the ground that it occupied in the operating position thereof comprising a pair of vertically spaced substantially parallel links pivotally connected at one end to the member and at their other ends to the implement, one of said links being extensible during vertical movement of the implement to compensate for the angular movement thereof, stop means on said link to limit the extensibility thereof, and a connection between said member and the other of said links operable to limit pivoting of the latter relative to the member.

3. In an agricultural implement, a support, an implement-carrying member pivotally mounted on the support for rocking movement relative thereto to vertically move the implement through an angular path between operating and transport positions, and means in the connection of the implement to the member for maintaining the implement in substantially the same angular relationship with the ground that it occupied in the operating position thereof comprising a pair of vertically spaced substantially parallel links pivotally connected at one end to the member and at their other ends to the implement, one of said links comprising relatively slidable parts adapted for relative movement during vertical movement of the implement to compensate for the angular movement thereof, stop means for limiting the relative movement of said parts in either direction, and means on said member engageable with the other of said links to prevent relative pivoting of the latter.

4. In an agricultural implement, a support, an implement-carrying member pivotally mounted on the support for rocking movement relative thereto to vertically move the implement through an angular path between operating and transport positions, and means in the connection of the implement to the member for maintaining the implement in substantially the same angular relationship with the ground that it occupied in the operating position thereof comprising a flexible connection between the implement and said member operable upon lifting the implement to transport position to compensate for the angular movement thereof comprising a link pivotally connected at one end to the implement and at the other end to the member, means associated with the implement-carrying member and cooperable with said link to limit pivoting of the latter relative to said member, a telescoping link pivotally connected to the implement and to the member at locations vertically spaced from the connections of the first mentioned link thereto, and stop means for limiting the telescoping of said link.

5. In an agricultural implement adapted for mounting upon a tractor or the like, earth-working tools substantially parallel to the ground in operating position, and means for raising the tools to transport position on the tractor while maintaining their substantial parallelism with the ground comprising a transversely extending tool carrier pivotally mounted on the tractor for rocking movement relative thereto to raise and lower the tools through an angular path about the pivot axis of the tool carrier, and vertically spaced generally parallel links connected at one end to said tool carrier and at their other ends to the tools, said links accommodating vertical floating movement of the tools in operating position one of said links being variable in length during lifting of the tools, stop means on said link to limit the variation in length thereof, and means associated with said carrier and cooperable with the other of said links to render the latter rigid with respect to the carrier after a predetermined angular movement of the latter.

6. In an agricultural implement adapted for mounting upon a tractor or the like, earth-working tools substantially parallel to the ground in operating position, bracket means carried by the tractor, a pair of generally parallel links pivotally connected to the bracket means and to the tools at vertically spaced locations, means limiting downward movement of the links about their pivots on the bracket comprising a lost-motion connection between the bracket and the lower of said links, means for lifting the tools to transport position on the tractor including a connection between the lift means and the bracket for imparting angular movement to the bracket means, the upper of said links comprising relatively slidable parts accommodating elongation of said link during operation of the lift means to raise the tools, and stop means for limiting the relative sliding of said parts.

7. In an agricultural implement adapted for mounting upon a tractor or the like, earth-working tools substantially parallel to the ground in operating position, bracket means carried by the tractor, a pair of generally parallel links pivotally connected to the bracket means and to the tools at vertically spaced locations, means associated with the bracket means and cooperable with one of said links for limiting downward movement of the links about their pivots on the bracket, and means for lifting the tools to transport position on the tractor including means on the tractor for imparting angular movement to the bracket means about a transverse axis, the upper of said links being elongatable during operation of the lift means to raise the tools, whereby the tools remain substantially parallel to the ground in transport position, and stop means on said upper link to limit the elongation thereof.

8. In an agricultural implement adapted for mounting upon a tractor or the like, earth-working tools substantially parallel to the ground in operating position, bracket means carried by the tractor, a pair of generally parallel links pivotally connected to the bracket means and to the tools at vertically spaced locations, means associated with the bracket means and cooperable with one of said links for limiting downward movement of the links about their pivots on the bracket, and means for lifting the tools to transport position on the tractor including means on the tractor for imparting angular movement to the bracket means about a transverse axis, said links being rigid in the operating position of the tools to accommodate vertical movement thereof in a substantially straight line, and one of said links being variable in length to compensate for the angular movement of the bracket means and maintain the tools substantially parallel to the ground in transport position, and stop means on said link to limit the variation in length thereof.

References Cited in the file of this patent

UNITED STATES PATENTS

| Number | Name | Date |
| --- | --- | --- |
| 2,328,174 | Silver | Aug. 31, 1943 |
| 2,354,886 | Silver | Aug. 1, 1944 |
| 2,455,727 | Bunting | Dec. 7, 1948 |
| 2,533,542 | Walz et al. | Dec. 12, 1950 |